US006771956B1

United States Patent
Beeler

(10) Patent No.: US 6,771,956 B1
(45) Date of Patent: *Aug. 3, 2004

(54) REAL TIME CALL DATA ANALYSIS AND DISPLAY

(75) Inventor: John Beeler, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 647 days.

This patent is subject to a terminal disclaimer.

(21) Appl. No.: 09/709,119

(22) Filed: Nov. 8, 2000

(51) Int. Cl.[7] .......................... G06F 7/00; H04B 17/00; H04Q 7/20

(52) U.S. Cl. ................ 455/423; 455/67.11; 455/115.1; 455/424; 455/425; 379/9; 379/10.3; 707/100

(58) Field of Search .............................. 455/422.1, 423, 455/424, 425, 426, 432.3, 445, 446, 67.11, 67.14, 9, 115.1; 379/1.01, 8, 9, 10.3, 15.02, 27.01, 29.01; 709/223, 224; 707/100; 702/182, 183, 188

(56) References Cited

U.S. PATENT DOCUMENTS

| | | | | | |
|---|---|---|---|---|---|
| 5,101,424 A | * | 3/1992 | Clayton et al. | .......... | 379/10.03 |
| 5,606,604 A | * | 2/1997 | Rosenblatt et al. | .......... | 379/198 |
| 6,603,966 B1 | * | 8/2003 | Sheffield | ...................... | 455/423 |
| 2002/0123338 A1 | * | 9/2002 | Iyer | .......................... | 455/423 |
| 2002/0123341 A1 | * | 9/2002 | Iyer | .......................... | 455/426 |
| 2002/0137527 A1 | * | 9/2002 | Iyer | .......................... | 455/457 |

* cited by examiner

*Primary Examiner*—Erika Gary
*Assistant Examiner*—K. Afshar
(74) *Attorney, Agent, or Firm*—Kirkpatrick & Lockhart LLP

(57) ABSTRACT

A system and method to monitor call data for a number of cellular phones simultaneously and in real time. A UNIX-based diagnosis software allows flexibility and versatility in call monitoring and functionality testing of a cellular switch. The diagnosis software scans and parses, in real time, the call data received from a cellular switch so as to enable a technician to monitor (and diagnose) the radio environment of a cell when a call is placed from that cell. Additional cellular switch-specific data such as, for example, radio channels assigned to a cell phone call, handoff signals communicated, power level for a radio link, etc., may also be monitored on a per-call basis. Thus, simultaneous and real time testing of more than one radio link can be performed by a technician in a cellular service provider's network during, for example, routine maintenance of a cellular switch, installation and testing of a new switch, addition or reconfiguration of a cell site, etc.

7 Claims, 1 Drawing Sheet

REAL TIME CALL DATA ANALYSIS AND DISPLAY

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Field of the Invention

The present invention broadly relates to cellular telephone systems, and more particularly, to a system and method for real time analysis and display of call data generated by a cellular switch.

2. Description of the Related Art

Telephone communication has seen a phenomenal growth since its inception because of its extreme usefulness in today's world. It is hard, and almost impossible, to conceive a world without telephones. Telephones have almost become an integral part of a civilized society. Modern telephones include generic desk-top telephone units, cordless telephones and more advanced cellular telephones (or "cell phones"). In contrast to a cordless telephone unit, a cellular telephone allows portability in that a cell phone operator can use the cell phone thousands of miles from home and is supported by a sophisticated telecommunications system.

A cellular service provider's network includes a number of interconnected cellular switches or mobile switching centers (MSCs) that facilitate cell phone portability in the network. The cellular network also typically includes a large number of cell sites, with each MSC generally serving more than one cell site. The cell phone operated by a mobile subscriber (MS) communicates with an appropriate base station over a radio link established between the base station and the cell phone. The base station, in turn, forwards signals received from the cell phone to the corresponding MSC for further processing and propagation. Similarly, the base station relays messages received from the MSC to the appropriate cell phone within the cell site served by the base station. Thus, the base station may be viewed as a conduit of messages exchanged between the MSC and a cell phone.

It is observed that the cellular service provider may add more cell sites (and base stations) or reconfigure existing cell site boundaries to cope with increased cellular traffic in the service provider's cellular network. The increased cellular traffic may have resulted from the new cell phone operators or mobile subscribers signing up for the service provider's cellular services and operating within the network, or from increased usage of the cellular services by existing subscribers. The addition of new cell sites or reconfiguration of existing cell sites to accommodate increased cellular traffic requires that the new (or reconfigured) cell sites effectively communicate with corresponding MSCs. In other words, the radio communication between a new (or existing) cell site and its anchor MSC may need to be monitored to evaluate whether the MSC recognizes the cell site. Also, any new MSCs added in the cellular network, or any MSCs already operational in the network, may need to be maintained and routinely checked for effective radio communication with a cell phone operative within the cellular network region served by the respective MSC.

A cellular switch (or MSC) may continuously generate a large amount of data during operation because of its communication with a large number of cellular phones operative within the MSC's serving region. It may therefore be difficult for a technician maintaining or servicing the MSC to simultaneously monitor the large number of radio links over which the MSC is communicating (via respective base stations) with cell phones. Also, current tools available to diagnose or maintain the MSC with regard to any problems with one or more radio links connecting with the MSC do not allow more than one technician to test a radio link at a time. In other words, current switch testing and diagnosis tools do not allow for simultaneous testing of more than one radio link.

It is therefore desirable to provide a tool that allows simultaneous and real time testing of more than one radio link as part of a number of different maintenance and diagnosis functions performed by a technician in a cellular service provider's network such as, for example, routine maintenance of a cellular switch (or MSC), installation and testing of a new switch, addition or reconfiguration of a cell site, etc.

SUMMARY OF THE INVENTION

In one embodiment, the present invention contemplates a method for analyzing call-specific data for each of a first plurality of cellular phone calls. The method comprises a first computer receiving a portion of the call-specific data for each of a second plurality of cellular phone calls, wherein the first plurality of cellular phone calls is part of the second plurality of cellular phone calls; and the first computer parsing the portion of the call-specific data for each of the second plurality of cellular phone calls based on one or more predetermined parameters contained in each said portion to identify the call-specific data, for said each of the first plurality of cellular phone calls. In one embodiment, the first computer uses the MIN (Mobile Identification Number) parameter to parse the call-specific data received thereby.

In another embodiment, the present invention contemplates a system to process in real time call-specific data generated within a cellular telephone network. The system comprises a first computer configured to receive a portion of the call-specific data for each of a first plurality of cellular phone calls handled by the cellular telephone network, wherein a second plurality of cellular phone calls is part of the first plurality of cellular phone calls, and wherein the first computer is configured to parse the portion of the call-specific data for each of the first plurality of cellular phone calls based on a predetermined parameter to identify the call-specific data for each of the second plurality of cellular phone calls; and a second computer in communication with the first computer, wherein the second computer is configured to receive the call-specific data for each of the second plurality of cellular phone calls from the first computer and to display the call-specific data received from the first computer.

The first computer runs a UNIX-based diagnosis software that allows flexibility and versatility in call monitoring and functionality testing of a cellular switch within a cellular telephone network. The diagnosis software scans and parses, in real time, the call data received from a cellular switch so as to enable a technician employed by the cellular service provider to monitor and diagnose the radio environment of a cell when a call is placed from that cell. Additional cellular switch-specific data such as, for example, radio channels assigned to a cell phone call, handoff signals communicated, power level for a radio link, etc., may also be monitored on a per-call basis. Thus, simultaneous and real time testing of more than one radio link can be performed by a technician in a cellular service provider's network during, for example, routine maintenance of a cellular switch, installation and testing of a new switch, addition or reconfiguration of a cell site, etc. With the help of the diagnosis software, a technician or a group of technicians can monitor call data for a number of cellular phones simultaneously and in real time.

BRIEF DESCRIPTION OF THE DRAWINGS

Further advantages of the present invention may be better understood by referring to the following description taken in conjunction with the accompanying drawings, in which.

DETAILED DESCRIPTION

Figure 1:
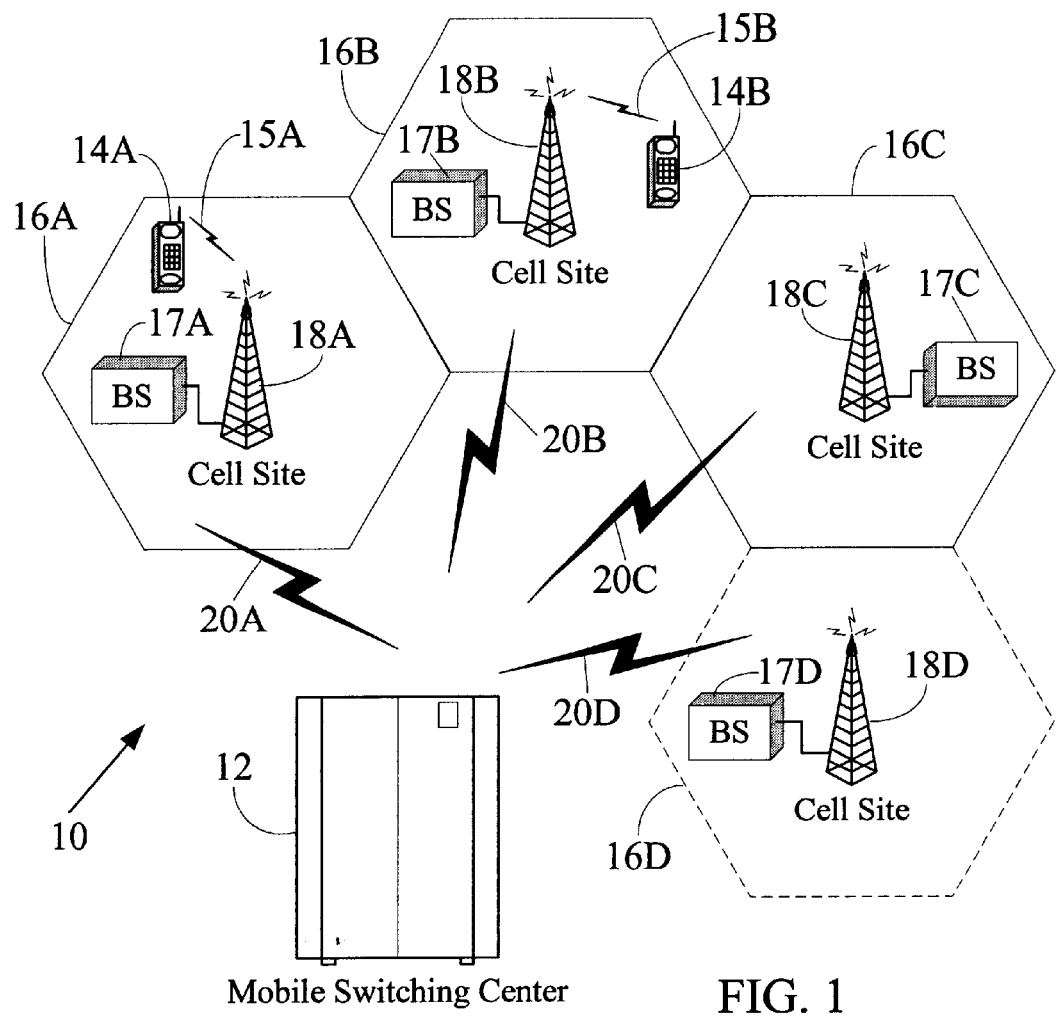
FIG. 1 shows a mobile switching center in wireless communication with a number of cell sites in a cellular service provider's network.

FIG. 1 shows a mobile switching center (MSC) or a cellular switch 12 in wireless communication with a number of cell sites 16A, 16B, 16C, and 16D, in a cellular service provider's network 10. Each cell site 16A–16D may include a base station (BS) 17A–17D that communicates over radio links (e.g., radio links 15A and 15B) with cellular telephones (e.g., cell phones 14A and 14B) within that cell site using a corresponding wireless transmission tower 18A–18D. The mobile switching center (MSC) 12 is a functional entity that represents an automatic wireless message switching system. The MSC 12 is in direct wireless communication with the base stations 17A–17D via corresponding radio links 20A–20D. The MSC 12 receives numerous signals from the base stations 17A–17D, such as call initiation signals, call termination signals, voice communication signals, etc., transmitted by the cell phones (e.g., the cell phones 14A and 14B) to their nearest base station transmission towers (e.g., towers 18A and 18B). The MSC 12 may be distinguished from an MTSO (mobile telephone switching office) (not shown), which may refer more to the physical architecture of the wireless switching office including switching hardware, the physical building, etc. The MSC 12 typically provides an interface for user traffic between a cellular network (e.g., the cellular telephone network 10) and other public switched telephone networks (PSTNs) or other MSCs in the same or other networks.

It is noted that the terms "mobile subscriber", "network subscriber" and "mobile user" are used interchangeably hereinbelow. A "mobile subscriber (MS)" (not shown) may be a human individual who has subscribed to one or more mobile wireless services. The term "mobile subscriber", as used herein, also includes a mobile service user who uses the subscribed wireless service(s) with a cellular telephone. The term "cellular telephone" may include an analog or digital mobile telephone handset (e.g., the handset 14A) or a computer equipped for wireless communication (not shown) or any other similar cellular telecommunication device that is capable of voice and/or data communication in a wireless network. Further, "mobile communication" may include voice, data or any other information communicated via a mobile wireless network. The terms "wireless network" or "mobile wireless network" as used herein are contemplated to include analog or digital cellular mobile networks irrespective of the underlying transmission technology, e.g., CDMA (code division multiple access), TDMA (time division multiple access), etc., and any other radio network that employs intersystem messaging (e.g., IS-41 based messaging scheme) as part of mobile wireless communication.

The MSC 12 provides basic switching functions and coordinates the establishment of calls to and from cellular subscribers. Thus, the MSC 12 is responsible for various call processing as well as mobile subscriber mobility management functions. As part of its call processing functions, the MSC 12 may receive certain mobile subscriber-specific data from the base stations served by the MSC 12. The base station may receive the subscriber-specific data when a mobile subscriber (or cell phone operator) initiates a telephone call using a cellular telephone. Thus, the subscriber-specific data may get communicated to the MSC 12 via a series of radio links such as, for example, via the radio links 15A and 20A when a telephone call is placed using the cell phone 14A. The subscriber-specific data may include the MIN (Mobile Identification Number) and the ESN (Electronic Serial Number) for the cellular telephone being operated by the mobile subscriber, the destination telephone number for the telephone call, one or more radio channels assigned during the telephone call by the respective base station in the wireless network and the cell site from which the mobile telephone call was placed.

The base station 17A–17D in each cell-site 16A–16D receives radio communications from cellular telephones operative in the corresponding cell-site. For example, the base station 17B in the cell-site 16B communicates with the cell phone 14B via radio:signals transmitted and received (over the radio link 15B) by the base station transmission tower 18B. Thus, a base station provides a radio interface between a wireless network and the cell phones operative within the geographic region covered by the base station. A base station controls radio resources and manages network information (for example, radio channel assigned during a call) that is required to provide telecommunications services to the mobile subscriber. A base station (e.g., the base station 17B) consists of one or more radio transceivers, one or more transmission towers (e.g., the transmission tower 18B), and one or more radio transceiver controllers serving one or more cells. A cell is the geographic area defined by the telecommunications coverage of the radio equipment located at a given cell site. A cell-site, e.g., the cell-site 16B, is the physical location of a cell's radio equipment (i.e., the base station 17B) and supporting systems. A base station for a cell-site incorporates radio functions and radio resource control functions.

As noted earlier hereinbefore, the cellular service provider may reconfigure cell-site boundaries or may even add a new cell site depending on the growth of the cellular telephone communication traffic. In FIG. 1, cell site 16D is shown dotted to indicate that the site has been added to the cellular service provider's network 10. Thus, the service provider may add many more such cell sites, remove some of the existing sites, or reconfigure cell site boundaries for some or all of the existing cell sites to accommodate the increased cellular customer base. Additionally (or alternatively), the cellular service provider may upgrade or replace the existing MSC with a more technologically-advanced one to better serve the growing needs of the mobile subscribers. In any of such events, it is desirable that a technician employed by the cellular service provider be able to monitor, maintain, or diagnose the MSC 12 in real time to ascertain whether the MSC 12 properly functions vis-à-vis the cell sites served by the MSC 12. For example, it may be desirable to test whether the MSC 12 recognizes a new cell site when the new site becomes operational, or whether the subscriber-specific data originating from a cell phone (e.g., the cell phone 14A) reaches the corresponding MSC (i.e., the MSC 12) and whether the MSC recognizes that data for further processing. Sometimes, testing of the MSC 12 may be necessary when a mobile subscriber complains about not being able to operate the subscriber's cell phone in certain cell sites or regions of the service provider's network 10.

Figure 2:
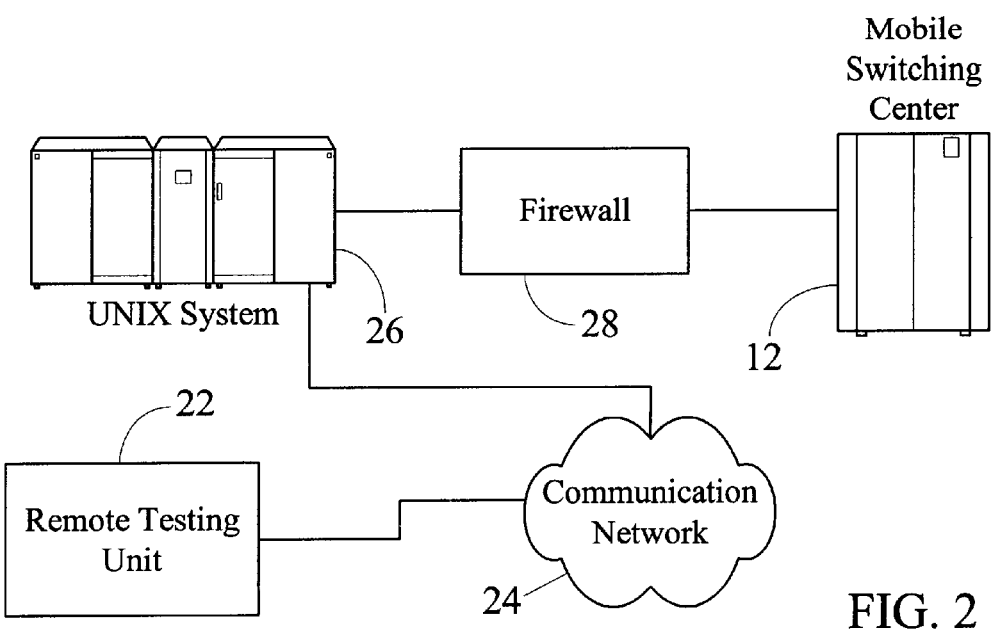
FIG. 2 illustrates an arrangement for real time testing of the mobile switching center from a remote location.

FIG. 2 illustrates an arrangement for real time testing of the mobile switching center 12 from a remote location. The MSC 12 may be tested using a remote testing unit 22. The remote testing unit 22 may be present at a location that is physically different from that of the MSC 12. For example, the MSC 12 may be physically installed in city A, whereas the remote testing unit 22 may be in city B. The remote testing unit 22 is shown connected to a UNIX system 26 (described in more detail hereinbelow) via a communication network 24. The communication network 24 facilitates data communication between the UNIX system 26 and the remote testing unit 22, and includes a combination of wireline and wireless networks such as, for example, a WAN (wide area network), a MAN (metropolitan area network), the Internet, a wireless local loop, a Bluetooth-based wireless LAN (local area network), etc. The remote testing unit 22 may be a general-purpose PC (personal computer), a computer workstation, or a dedicated portable testing unit that is capable of data communication over the communication network 24.

In the arrangement illustrated in FIG. 2, the MSC 12 is also shown connected to the UNIX system 26 via a firewall 28. As is known in the art, the firewalls provide a level of security in data communication. Here, the firewall 28 protects the data communication between the MSC 12 and the UNIX system 26 as well as prevents unauthorized users to access the UNIX system 26 (as described hereinbelow) during maintenance and testing of the MSC 12. The firewall 28 thus protects the MSC 12 against unauthorized tampering. However, in an alternative embodiment, the firewall 28 may be absent if so desired by the cellular service provider. The UNIX system 26 is a computer system (e.g., a mainframe computer or a server computer) that runs on the UNIX operating system. The diagnosis software according to the present invention resides on the UNIX system 26 and runs on the UNIX operating system. The execution of the diagnosis software is initiated from the remote testing unit 22. It is noted that diagnosis software similar to that discussed hereinbelow may be developed for an operating system other than UNIX and, hence, may be executed on other non-UNIX based computer systems. Furthermore, the diagnosis software may be initially stored on a computer-readable storage medium (not shown), e.g., a floppy diskette, a compact disc (CD), a magnetic tape cartridge, or any similar magnetic/electromagnetic or optical storage medium. Thereafter, the software may be "loaded" onto the UNIX system 26 or onto another non-UNIX based computer system for execution.

The diagnosis software residing in the UNIX system 26 receives call data generated by the MSC 12 on a per-call basis. The call data about every telephone call placed in the cellular region served by the MSC 12 is sent to the UNIX system 26 by the MSC 12. The content of the call data sent to the UNIX system 26 may be in a proprietary format and that format may depend on the type of the cellular switch 12 (e.g., Lucent switch, Ericsson switch, etc.). The call data from the MSC 12 may include a large amount of information related to a specific phone call. For example, in addition to the subscriber-specific data mentioned hereinbefore (e.g., the MIN and the ESN for the cellular telephone, the destination telephone number, etc.), the call data generated by the MSC 12 may also include such information as the time of the placement of the telephone call, the duration of the telephone call, facilities in the wireless network that are used to complete the telephone call, etc.

The diagnosis software according to the present invention includes two UNIX-based software scripts, with one script calling the other script when a user (i.e., the operator of the remote testing unit 22) initiates execution of the diagnosis software. The calling script may be a simple one or two-line UNIX program that performs a regular calling function; whereas the script to be called performs the data scanning and parsing function. The called script may be written as a text file in the AWK language, which is a programming language available on UNIX-based computer systems. Being in a text file format and running on the UNIX system 26, the called script (in AWK language) may be read and accessed by more than one user simultaneously. In other words, more than one remote testing unit 22 may simultaneously access the data from the MSC 12 (received at the UNIX system 26) so as to diagnose or test data communication over more than one radio link or data communication originating from more than one cell phone. For example, one technician at a remote test site X may monitor the data received by the MSC 12 from the cell phone 14A, whereas another technician may monitor the data from the cell phone 14B at another remote test site Y. Both of these technicians may access the UNIX system 26 using their respective test units (not shown).

The diagnosis software receives a large amount of data (e.g., on the order of 2.5–3 GB per hour) generated by the MSC 12 and efficiently scans and parses (during a single iteration of the diagnosis software) the data to retrieve the information requested by the user operating the remote testing unit 22. For example, the users of the cell phones 14A and 14B may report having difficulty in operating their respective cell phones in the service provider's network 10. The service provider may instruct two technicians to monitor, in real time, the signals over the radio links 20A and 20B to ascertain whether the MSC 12 correctly recognizes respective cell sites (here, sites 16A and 16B) and whether the MSC 12 correctly reports the call data to the UNIX system 26. The technicians may input MINs for the cell phones 14A and 14B to the diagnosis software using their respective remote testing units. The diagnosis software may analyze the call data received from the MSC 12 by identifying and parsing the MIN (mobile identification number) field from different data packets and extracting call data information for the MINs requested by the technicians to be monitored. Thereafter, the diagnosis software may send the extracted information to corresponding remote testing units where the call data information for the monitored MINs can be displayed on the testing unit display screens (not shown) in a scrolling column format.

Thus, the diagnosis software reports a wide variety of information, in real time, to a remote testing unit requesting the information for a particular MIN. In an alternative embodiment, the diagnosis software may be configured to analyze the call data received from the MSC 12 based on screening and parsing of a non-MIN field in the data packets received. In another embodiment, the service provider may require one technician to monitor technical information for more than one cellular subscriber instead of deploying one technician per cellular subscriber to be helped. The remote testing unit 22 may function as a common receiver of the information requested by the operator of the remote testing unit 22 to be diagnosed by the diagnosis software in the UNIX system 26. The diagnosis software may send the analyzed information (e.g., using MIN-based screening and parsing) for each subscriber to be monitored to the common remote testing unit 22 where the information can be displayed in a scrolling data-column format in a number of adjacent columns—one column per customer.

The customized call-data analysis performed by the diagnosis software of the present invention allows for real time viewing of a number of different parameters handled by the MSC 12 during its operation. For example, the operator/technician can simultaneously view, on the display screen (not shown) of the remote testing unit 22, communications data for a number of different radio channels within a cell site. Such radio channels may correspond either to a single mobile cell phone or to a number of different cell phones. Furthermore, by monitoring with the diagnosis software the communication that takes place over one or more radio channels, the technician can also see (on the display screen of the remote testing unit 22) the sequence of hand-off signals/parameters exchanged between, for example, the MSC 12 and another MSC (not shown) in the service provider's network 10. Similarly, by observing the customized data output from the MSC 12, the technician may also determine the level of power output from a cell site and whether each radio link from a cell site operates at an appropriate power level for effective communication. The diagnosis software thus "demultiplexes" caller information for a number of cell phone users in the service provider's network and allows real time viewing of such caller information from a remote location. In one embodiment, sixteen calls may be monitored simultaneously in real time with the diagnosis software.

The foregoing describes a software tool to monitor call data for a number of analog or digital cellular phones simultaneously and in real time. The UNIX-based diagnosis software allows flexibility and versatility in call monitoring and functionality testing of a cellular switch. The diagnosis software scans and parses, in real time, the call data received from a cellular switch and sends the requested information to a remote display terminal so as to enable a technician to monitor (and diagnose) the radio environment of a cell when a call is placed from that cell. Each such call trace is performed with a single iteration of the diagnosis software. Additional MSC-specific data such as, for example, radio channels assigned to a cell phone call, handoff signals communicated, power level for a radio link, etc., may also be monitored on a per-call basis. Thus, simultaneous and real time testing of more than one radio link can be performed by a technician in a cellular service provider's network during, for example, routine maintenance of a cellular switch, installation and testing of a new switch, addition or reconfiguration of a cell site, etc.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method for analyzing call-specific data for each of a first plurality of cellular phone calls, said method comprising:

a first computer receiving a portion of said call-specific data for each of a first plurality of cellular phone calls, wherein a second plurality of cellular phone calls is part of said first plurality of cellular phone calls;

said first computer parsing said portion of said call-specific data for each of said first plurality of cellular phone calls based on one or more predetermined parameters contained in each said portion to identify said call-specific data for said each of said second plurality of cellular phone calls, wherein the one or more predetermined parameters includes a mobile identification number (MIN);

a second computer initiating execution of instructions residing on the first computer, wherein the instructions cause the first computer to perform the parsing, wherein the first computer is at a first location, and wherein the second computer is at a second location that is remote from the first location; and the first computer generating a viewable report containing the call-specific data for the each of the first plurality of cellular phone calls;

wherein said receiving, parsing and generating functions by said first computer are performed in real time.

2. The method of claim 1, further comprising:

a second computer receiving from said first computer said call-specific data for at least one of said first plurality of cellular phone calls; and said second computer displaying said call-specific data for said at least one of said first plurality of cellular phone calls.

3. A computer-readable medium having stored thereon instructions which, when executed by a processor, cause the processor to:

receive a portion of call-specific data for each of a first plurality of cellular phone calls, wherein a second plurality of cellular phone calls is part of said first plurality of cellular phone calls;

parse said portion of said call-specific data for each of said first plurality of cellular phone calls based on a predetermined parameter to identify said call-specific data for each of said second plurality of cellular phone calls, wherein the parsing is initiated from a remote location; and generate a viewable report containing the call-specific data for the each of the second plurality of cellular phone calls, wherein the receiving, parsing, and generating are performed in real time; and identify a functional entity within the cellular telephone network as a source of malfunction based on review of said call-specific data for said at least one of said second plurality of cellular phone calls; wherein the instructions are implemented in the AWK programming language.

4. The computer-readable medium of claim 3, wherein the instructions, upon execution, cause the processor to transmit said call-specific data for said each of said second plurality of cellular phone calls to a display device.

5. A system to process call-specific data generated within a cellular telephone network in real time, said system comprising:

a first computer configured to receive a portion of said call-specific data for each of a first plurality of cellular phone calls handled by said cellular telephone network, wherein a second plurality of cellular phone calls is part of said first plurality of cellular phone calls, and wherein said first computer is configured to parse said portion of said call-specific data for each of said first plurality of cellular phone calls based on a predetermined parameter to identify said call-specific data for each of said second plurality of cellular phone calls, and wherein the first computer is at a first location; and a second computer in communication with said first computer,
- wherein the second computer is configured to receive said call-specific data for each of said second plurality of cellular phone calls from said first computer and to display said call-specific data received from said first computer,
- wherein the second computer is configured to transmit an indication to the first computer to initiate parsing of the portion of the call-specific data for each of the first plurality of cellular phone calls,
- wherein the second computer is at a second location that is remote from the first location, and
- wherein the second computer is configured to allow an operator thereof to send the predetermined parameter to the first computer using the second computer:
- wherein said receiving and parsing functions by said first computer and said receiving and displaying functions by said second computer are performed in real time.

6. The system of claim 5, wherein said first computer is configured to receive said portion of said call-specific data for each of said first plurality of cellular phone calls from a cellular switch within said cellular telephone network.

7. The system of claim 5, wherein an operating system for said first computer is UNIX.

\* \* \* \* \*